US012596602B2

(12) United States Patent
 Cady

(10) Patent No.: US 12,596,602 B2
(45) Date of Patent: Apr. 7, 2026

(54) ANOMALY DETECTION BASED ON STORAGE PROTOCOL CONNECTIONS

(71) Applicant: NetApp, Inc., San Jose, CA (US)

(72) Inventor: Tyler W. Cady, Austin, TX (US)

(73) Assignee: NetApp, Inc., San Jose, CA (US)

( * ) Notice: Subject to any disclaimer, the term of this patent is extended or adjusted under 35 U.S.C. 154(b) by 22 days.

(21) Appl. No.: 18/643,558

(22) Filed: Apr. 23, 2024

(65) Prior Publication Data

US 2025/0328404 A1 Oct. 23, 2025

(51) Int. Cl.
 G06F 11/00 (2006.01)
 G06F 11/07 (2006.01)
(52) U.S. Cl.
 CPC ...... G06F 11/0772 (2013.01); G06F 11/0793 (2013.01)
(58) Field of Classification Search
 CPC .......................... G06F 11/0772; G06F 11/0793
 See application file for complete search history.

(56) References Cited

U.S. PATENT DOCUMENTS

| | | | |
|---|---|---|---|
| 8,156,382 B1 * | 4/2012 | Booth | ................. G06F 11/3055 |
| | | | 714/47.1 |
| 9,311,176 B1 * | 4/2016 | Khokhar | ............... G06F 11/008 |
| 12,355,782 B1 * | 7/2025 | Sylvester | ................ H04L 63/20 |
| 2019/0102216 A1 * | 4/2019 | Mathur | .................... G06F 9/485 |
| 2019/0129777 A1 * | 5/2019 | Rangarajan | ......... G06F 11/1076 |
| 2023/0229550 A1 * | 7/2023 | Zhao | ................... H04L 41/0627 |
| | | | 714/33 |
| 2024/0143462 A1 * | 5/2024 | Jain | ....................... G06F 11/076 |
| 2025/0117299 A1 * | 4/2025 | Jain | ..................... G06F 11/2048 |
| 2025/0165331 A1 * | 5/2025 | Clas | ..................... G06F 11/0727 |

* cited by examiner

*Primary Examiner* — Joshua P Lottich

(74) *Attorney, Agent, or Firm* — Jaffery Watson Hamilton & DeSanctis LLP

(57) ABSTRACT

Systems and methods for anomaly detection within a storage system based on a number of storage protocol connections are provided. In one example, alerting thresholds based on storage protocol connections are made more relevant and customer-specific by taking into consideration, among other things, one or more of the type/class/model of storage system, the configuration of the storage system, the type of the workload making use of the storage system, and various windows of time. Based on the customer-specific nature of the alerts generated by the proposed alerting system, potential performance issues being experienced by the storage system may be more efficiently identified and remediated, for example, by customer service/support, the customer, or possibly by automated storage system (on-box) functionality.

18 Claims, 8 Drawing Sheets

ANOMALY DETECTION BASED ON STORAGE PROTOCOL CONNECTIONS

BACKGROUND

Field

Various embodiments of the present disclosure generally relate to storage systems, monitoring the performance/health thereof, and the use of machine-learning (ML). In particular, some embodiments relate to detecting the occurrence of anomalies within a storage system based on a number of storage protocol connections made by clients of the storage system.

Description of the Related Art

Temporary and/or sustained spikes in storage protocol connections can be indicative of performance issues, a networking problem, and/or a misconfiguration of a storage system. Examples of various storage protocols supported by virtual and physical storage systems include Internet Small Computer System Interface (iSCSI), Non-Volatile Memory Express (NVMe), Server Message Block (SMB), Network File System (NFS), Common Internet File System (CIFS), Fiber Channel (FC), Fibre Channel over Ethernet (FCoE), and NVMe over Fibre Channel (FC-NVMe or NVMeoF) protocols.

SUMMARY

Systems and methods are described for anomaly detection within a storage system based on a number of storage protocol connections. According to one embodiment, information is obtained that is indicative of a number of storage protocol connections between a host system running a workload and a storage device of a storage system during a predetermined or configurable time period. A connection count is generated for each of one or more bucketed sliding temporal windows based on the number of storage protocol connections and prior observations. For each of the one or more bucketed sliding temporal windows, the connection count is then categorized as anomalous or not by determining, by a machine-learning (ML) model, based on the connection count, the bucketed sliding temporal window, and prior training of the ML model on rolling temporal windows of historical data in relation to usage of the storage system by a particular organization for a particular type of workload.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
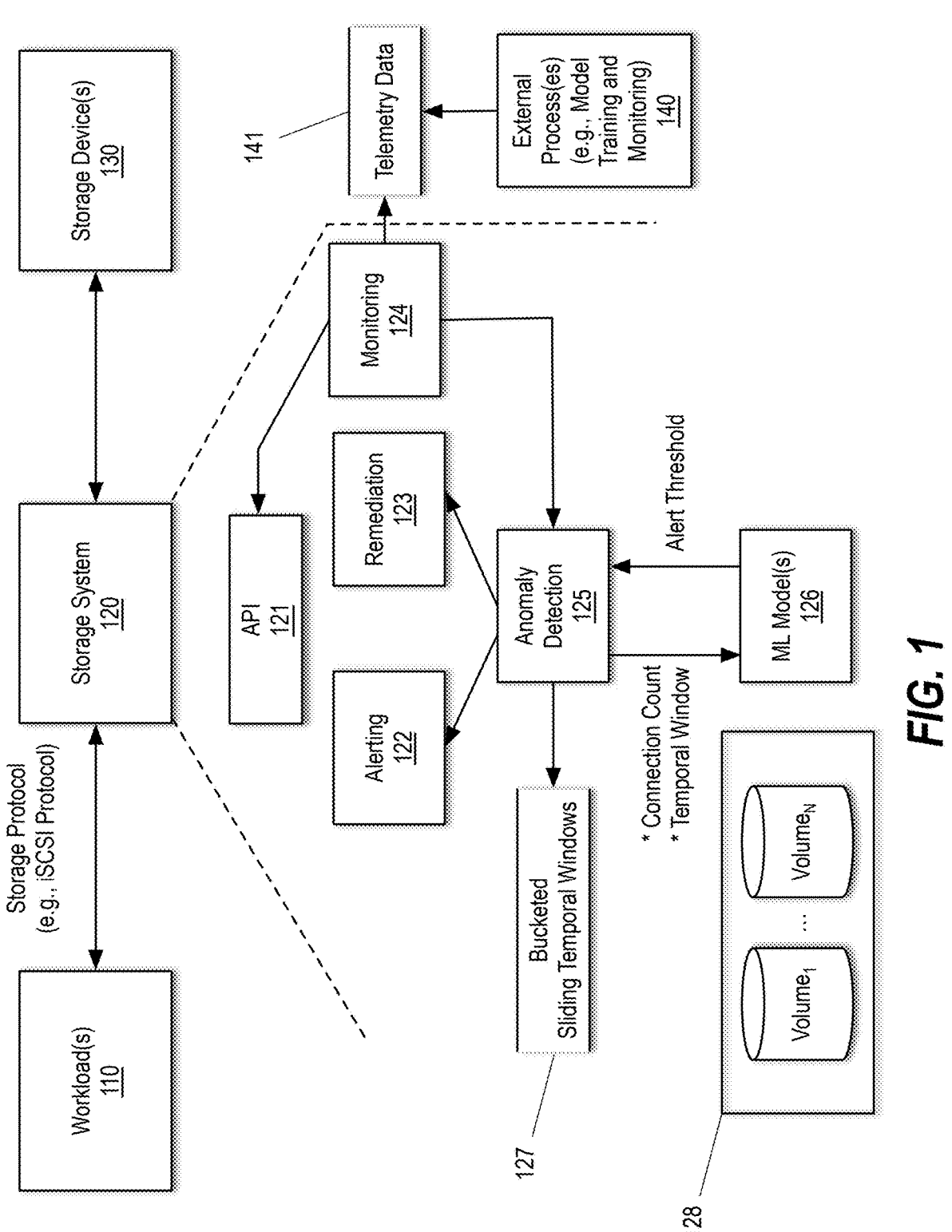
FIG. 1 is a block diagram conceptually illustrating a storage system implementing anomaly detection based on storage protocol connections in accordance with an embodiment of the present disclosure.

Systems and methods are described for anomaly detection within a storage system based on a number of storage protocol connections. As noted above, temporary and/or sustained spikes in storage protocol connections (e.g., iSCSI connections) can be indicative of performance issues, a networking problem, and/or a misconfiguration of a storage system. Existing brute force approaches may provide alerts when certain generalized thresholds (e.g., a number of iSCSI connections at a node or at a volume-level) are exceeded; however, because the established alert thresholds attempt to cast a wide net, customer service/support team members and/or administrative users are flooded with irrelevant alerts. Such over alerting ends up creating more of a headache than actually contributing to the management of the storage system. For example, alert fatigue may cause administrative users to simply ignore or suppress the alerts (e.g., by implementing custom alert suppression mechanisms to stem the flood). Alternatively or additionally, in order to avoid drowning in alerts, customer service/support team resources and/or administrative resources may be wasted by having team members sift through the extraneous alerts to identify whether any real issues exist.

In various examples described herein, alerting and/or remediation thresholds may be made more relevant and customer-specific by taking into consideration, among other things, one or more of the type/class/model of storage system, the configuration of the storage system, the type of the workload making use of the storage system, and various windows of time. According to one embodiment, a machine-learning model may be trained to detect anomalous patterns in the number of storage protocol connections as compared to historical data (e.g., one or more years' worth of customer telemetry data) to reduce the noisiness of the alerts, making them more helpful and less of a distraction. In this manner, expected spikes based on seasonal data (e.g., end-of-quarter activities, weekly payment processing activity, weekly, bi-weekly (every two weeks), semi-monthly (twice a month) and/or monthly payroll cycles, and the like) may be filtered out. The customer-specific alerts generated by the proposed alerting system can be used to warn of potential performance issues being experienced by the storage system and can be more efficiently identified and acted on manually by customer service/support, the customer, or possibly by automated storage system (on-box) functionality, for example, by logic to balance workloads.

In one embodiment, a light-weight anomaly detection machine-learning (ML) model (e.g., Isolation Forest or Random Cut Forest ML algorithms) may be trained on an individual customer's telemetry data (e.g., gathered over a number of years), for example, including numbers of storage protocol connections over time. An example of a potential ML classifiers that could be used include but are not limited to the following: Support Vector Machines, Artificial Neural Networks, and the like. Specifically, in one example, the number of iSCSI connections may be used to establish customer-specific and workload-specific iSCSI connection alerting thresholds (e.g., low, medium, and high importance), for example, based on analysis of empirical data and domain knowledge with support and engineering teams. By taking into consideration historical norms, the trained ML model will reduce the over alerting issue and allow support staff to focus on actual anomalies. Use of a lightweight anomaly detection approach facilitates the ability to perform on-box (local storage system) training and inferencing for customer systems that do not provide telemetry data. A non-limiting example of an Isolation Forest model is shown and described below with reference to FIG. 5B. Other examples of potential ML classifiers that could be used include but are not limited to the following: Support Vector Machines, Artificial Neural Networks, and the like. A non-limiting example of an ML classification model in the form of a neural network model is shown and described below with reference to FIG. 5C.

In operation, as the number of storage protocol connections are monitored (e.g., via remote (off-box) collection of telemetry data or on-box monitoring), the trained model can then be applied in real time to classify the number of storage protocol connections (e.g., at a node or at a volume level) as anomalous or not over a sliding window of time, for example, based on a correlation of contemporaneous storage system metrics (indicative of the health and/or performance of the storage system) with the number of storage protocol connections. The classifications over a sliding window of time can be bucketed to support different alerting thresholds. For example, 3 anomalous data points over a relatively short timeframe (e.g., 5 minutes) may trigger an alert of low-level importance or may represent a non-issue, whereas 100 anomalous data points over the same time period may trigger an alert of higher-level importance. Similarly, the same 100 anomalous data points over a longer timeframe (e.g., 1 hour) may trigger an alert of lower-level importance or may result in no alerting. In one example, feature engineering based on input from domain experts may be used to form an association between the various time windows, corresponding storage protocol connection counts, and contemporaneous health and/or performance metric levels that are indicative of performance degradation of the storage system.

Various embodiments of the present technology provide a range of technical effects, advantages, and/or improvements to computing systems and components. For example, various embodiments may include one or more of the following technical effects, advantages, and/or improvements: 1) use of non-routine and unconventional operations and/or approaches to facilitate more relevant, reliable, and actionable customer-specific and workload-specific alerting; 2) use of ML models (e.g., anomaly detection algorithms) trained on a per-workload basis for a given customer based on the number of storage protocol connections observed for a particular workload or type of workload during a predetermined or configurable sliding temporal window (potentially rolled into various bucketed timeframes) to filter out expected seasonal spikes while prioritizing and making more relevant the resulting alerting for individual customers; 3) use of non-routine and unconventional operations to correlate health and/or performance metrics of a storage system of a particular type/class/model and having a particular configuration while it is servicing a particular type of workload with storage protocol connection counts over various bucketed timeframes; and 4) improving the efficiency, reliability, and stability of a storage system by facilitating manual or automated remediation based on detection of anomalous activity meeting a particular storage protocol connection count alert threshold.

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

As used herein a "cloud" or "cloud environment" broadly and generally refers to a platform through which cloud computing may be delivered via a public network (e.g., the Internet) and/or a private network. The National Institute of Standards and Technology (NIST) defines cloud computing as "a model for enabling ubiquitous, convenient, on-demand network access to a shared pool of configurable computing resources (e.g., networks, servers, storage, applications, and services) that can be rapidly provisioned and released with minimal management effort or service provider interaction." P. Mell, T. Grance, The NIST Definition of Cloud Computing, National Institute of Standards and Technology, USA, 2011. The infrastructure of a cloud may be deployed in accordance with various deployment models, including private cloud, community cloud, public cloud, and hybrid cloud. In the private cloud deployment model, the cloud infrastructure is provisioned for exclusive use by a single organization comprising multiple consumers (e.g., business units), may be owned, managed, and operated by the organization, a third party, or some combination of them, and may exist on or off premises. In the community cloud deployment model, the cloud infrastructure is provisioned for exclusive use by a specific community of consumers from organizations that have shared concerns (e.g., mission, security requirements, policy, and compliance considerations), may be owned, managed, and operated by one or more of the organizations in the community, a third party, or some combination of them, and may exist on or off premises. In the public cloud deployment model, the cloud infrastructure is provisioned for open use by the general public, may be owned, managed, and operated by a cloud provider or hyperscaler (e.g., a business, academic, or government organization, or some combination of them), and exists on the premises of the cloud provider. The cloud service provider may offer a cloud-based platform, infrastructure, application, or storage services as-a-service, in accordance with a number of service models, including Software-as-a-Service (SaaS), Platform-as-a-Service (PaaS), and/or Infrastructure-as-a-Service (IaaS). In the hybrid cloud deployment model, the cloud infrastructure is a composition of two or more distinct cloud infrastructures (private, community, or public) that remain unique entities, but are bound together by standardized or proprietary technology that enables data and application portability (e.g., cloud bursting for load balancing between clouds).

As used herein, a "storage system" or "storage appliance" generally refers to a type of computing appliance or node, in virtual or physical form, that provides data to, or manages data for, other computing devices or clients (e.g., applications). A storage system may be part of a larger storage system (e.g., a cluster of multiple nodes representing a distributed storage system). Depending on the particular implementation, the storage system may be an on-premise storage solution or a cloud-based storage solution (e.g., run on one or more virtual machines (VMs) or as one or more containerized instances, as the case may be) within a public cloud provider.

As used herein, a "type of workload" or "workload type" generally refers to a categorization or classification of a workload. Workloads may be classified broadly or specifically based on a variety of ways, including in a non-mutually exclusive manner based on their demand for computational power as compared to their need to manage and process massive amounts of data and/or based on their relative demand for read or write operations. Workloads that involve tasks that demand substantial computational power (e.g., those involving complex computations, simulations, financial modeling, and/or scientific research) may be referred to as compute-intensive workloads, whereas workloads that focus on handling large amounts of data processing (e.g., those involving big data analytics and/or machine learning) may be referred to as data-intensive workloads. Workloads that demand high write performance and/or high write Input/Output Operations per Second (IOPS) (e.g., database logging, high-performance computing (HPC), and real-time analytics) may be referred to as a write-intensive workload, whereas workloads that demand high read performance and/or high read IOPS (e.g., media streaming, data mining, and machine learning) may be referred to as read-intensive workloads. Workloads may alternatively or additionally be classified broadly or specifically based on characteristics (e.g., degree of user interaction, reliance on queries, complexity of computations, need for responsiveness, etc.). For example, workloads may be classified as transactional workloads, batch workloads, analytical workloads, database workloads, HPC workloads, test and development workloads, real-time workloads, and hybrid workloads. Alternatively or additionally, workloads may be classified based on the specific business process involved (e.g., payroll processing).

As used herein, a "storage protocol" generally refers to existing or future protocols used in storage area network (SAN) or network attached storage (NAS) environments. Non-limiting examples of storage protocols include Internet Small Computer System Interface (iSCSI), Non-Volatile Memory Express (NVMe), Server Message Block (SMB), Network File System (NFS), Common Internet File System (CIFS), Fiber Channel (FC), Fibre Channel over Ethernet (FCoE), and NVMe Express over Fibre Channel (FC-NVMe or NVMeoF) protocols.

As used herein, a "storage protocol connection" generally refers to the protocol connection through which storage protocol messages, commands, parameters, and/or data may be sent between a data consumer and a data provider. In the context of iSCSI, a connection is a Transmission Control Protocol (TCP) connection between the initiator (e.g., a host-based network interface card) and the target (e.g., an intermediate storage system that exposes storage of an associated storage device as one or more SCSI Logical Unit Numbers (LUNs)). In one embodiment, the number of storage protocol connections represents a count of active/open storage protocol connections with a given node of a distributed storage system at any given period in time.

As used herein, the term "storage operating system" generally refers to computer-executable code operable on a computer to perform a storage function that manages data access and may, in the case of a storage system (e.g., a node or a storage cluster), implement data access semantics of a general purpose operating system. The storage operating system can also be implemented as a microkernel, an application program operating over a general-purpose operating system, such as UNIX or Windows NT, or as a general-purpose operating system with configurable functionality, which is configured for storage applications as described herein. In some embodiments, the storage operating system may expose an application programming interface (API) through which desired telemetry data or real-time system metrics may be retrieved, for example, by a local monitoring microservice running on a node of a cluster of nodes representing a distributed storage system or by an external monitoring service (e.g., hosted in the cloud or running on a computer system separate and apart from the storage system).

As used herein, "telemetry data" generally refers to performance, configuration, load, and other system data of a monitored system. Telemetry data may refer to one data point or a range of data points. Non-limiting examples of telemetry data for a distributed storage system include a number of storage protocol connections, latency, resource utilization (e.g., CPU or processing resource utilization, memory resource utilization, and/or storage resource utilization), a number IOPS, Quality of Service (QOS) settings, information relating to a state or configuration of the storage system, and/or any other desired storage system performance and/or health related information. In one example, storage protocol connections represent iSCSI connections at a volume-level on a per-client or per-workload basis.

As used herein, a "cloud volume" generally refers to persistent storage that is accessible to a virtual storage system by virtue of the persistent storage being associated with a compute instance in which the virtual storage system is running. A cloud volume may represent a hard-disk drive (HDD) or a solid-state drive (SSD) from a pool of storage devices within a cloud environment that is connected to the compute instance through Ethernet or fibre channel (FC) switches as is the case for network-attached storage (NAS) or a storage area network (SAN). Non-limiting examples of cloud volumes include various types of SSD volumes (e.g., AWS Elastic Block Store (EBS) gp2, gp3, io1, and io2 volumes for EC2 instances) and various types of HDD volumes (e.g., AWS EBS st1 and sc1 volumes for EC2 instances).

As used herein, a "storage pod" generally refers to a group of disks containing multiple Redundant Array of Independent (or Inexpensive) Disks (RAID) groups that are accessible from all storage systems (nodes) of a distributed storage system (cluster).

A "node-level aggregate" generally refers to a file system of a single storage system (node) that holds multiple volumes created over a set of one or more storage devices (e.g., disks or cloud volumes). The collection of storage devices may be partitioned into one or more RAID groups, in which the node owns the entire physical volume block number (PVBN) space of the collection of storage devices of the one or more RAID groups. Node-level aggregates are generally accessible to a single storage system (node) of a distributed storage system (cluster) at a time.

As used herein, a "storage volume" or "volume" generally refers to a container in which applications, databases, and file systems store data. A volume is a logical component created for the host to access storage on one or more storage devices (e.g., an SSD or HDD drive), cloud volume, or storage arrays. A volume may be created from the capacity available in storage pod, a pool, or a volume group. A volume has a defined capacity. Although a volume might consist of more than one drive, a volume appears as one logical component to the host. Non-limiting examples of a volume include a flexible volume and a flexgroup volume.

As used herein, a "flexible volume" generally refers to a type of storage volume that may be efficiently distributed across multiple storage devices or cloud volumes. A flexible volume may be capable of being resized to meet changing business or application requirements. In some embodiments, a storage system may provide one or more aggregates and one or more storage volumes distributed across a plurality of nodes interconnected as a cluster. Each of the storage volumes may be configured to store data such as files and logical units. As such, in some embodiments, a flexible volume may be comprised within a storage aggregate and further comprises at least one storage device. The storage aggregate may be abstracted over a RAID plex where each plex comprises a RAID group. Moreover, each RAID group may comprise a plurality of storage disks. As such, a flexible volume may comprise data storage spread over multiple storage disks or devices. A flexible volume may be loosely coupled to its containing aggregate. A flexible volume can share its containing aggregate with other flexible volumes. Thus, a single aggregate can be the shared source of all the storage used by all the flexible volumes contained by that aggregate. A non-limiting example of a flexible volume is a NetApp ONTAP Flex Vol volume.

As used herein, a "flexgroup volume" generally refers to a single namespace that is made up of multiple constituent/member volumes. A non-limiting example of a flexgroup volume is a NetApp ONTAP FlexGroup volume that can be managed by storage administrators, and which acts like a NetApp Flex Vol volume. In the context of a flexgroup volume, "constituent volume" and "member volume" are interchangeable terms that refer to the underlying volumes (e.g., flexible volumes) that make up the flexgroup volume.

Example Storage System

FIG. 1 is a block diagram conceptually illustrating a storage system 120 implementing anomaly detection based on storage protocol connections in accordance with an embodiment of the present disclosure. In the context of the present example, the storage system 120 presents one or more volumes 128 or logical unit numbers (LUNs) (not shown) to a file system (not shown) to support hosting/storage of application data created, utilized, and/or modified by one or more workloads 110 on storage devices 130 associated with the storage system 120. Depending on the environment in which the storage system 120 is deployed, the storage devices 130 may represent a number of disks (e.g., as part of one or more storage arrays) or cloud volumes.

In various embodiments described herein, alerting may be provided to customer support personnel and/or an administrative user of the storage system 120 regarding the health and/or performance of the storage system 120, for example, via a reporting dashboard (not shown) or other means (e.g., email, text messaging, or the like). While those of skill in the art will appreciate there are a number of other metrics that may be monitored and evaluated to provide insights relating to the operating condition of the storage system 120, in various examples described herein the focus is alerting or warning regarding the existence of potential performance issues, networking problems, and/or misconfiguration of the storage system 120 indicated by an unusually high number of storage protocol connections, for example, made on behalf of workload(s) 110 to the storage system 120 in connection with accessing data on storage device(s) 130.

In the context of the present example, various functional units associated with and/or utilized by the proposed alerting system are shown including an API 121, an alerting module 122, a remediation module 123, a monitoring module, an anomaly detection module 125, and one or more ML models 126.

The API 121 may provide an interface through which the storage system 120) is configured and/or queried by internal or external actors (e.g., the monitoring module 124 or external process(es) 140). Depending upon the particular implementation, the API 121 may represent a Representational State Transfer (REST)ful API that uses Hypertext Transfer Protocol (HTTP) methods (e.g., GET, POST, PATCH, DELETE, and OPTIONS) to indicate its actions. Depending upon the particular embodiment, the API 121 may provide access to various telemetry data (e.g., time series performance metrics, including, but not limited to, information indicative of a number of storage protocol connections made to the storage system 120 on behalf of the workload(s) 110) relating to the storage system 120 or components thereof. In one embodiment, an API method may be exposed for retrieving information regarding a number of storage protocol connections for a given volume or for all volumes of the storage system 120. As those skilled in the art will appreciate various other types of telemetry data may be made available via the API 121, including, but not limited to measures of data and/or metadata storage capacity usage and/or other performance metrics at various levels (e.g., a storage cluster level, a storge node level, or a storage node component level).

The monitoring module 124 may be responsible for polling the API 121 to retrieve desired metrics for use by the anomaly detection module 125 and for persisting collected metrics to an external (e.g., cloud-based) telemetry data store (e.g., telemetry data 141). Alternatively, this monitoring function may be performed by external process(es) 140.

The anomaly detection module 125 may be responsible for processing the received metrics into various bucketed sliding temporal windows 127 corresponding to one or more sliding temporal windows (e.g., 30 seconds, 1 minute, 5 minutes, 15 minutes, 30 minutes, 1 hour, 3 hours, 12 hours, 24 hours, etc.) for which the ML model(s) 126 were trained and different alerting thresholds supported by the ML model(s) 126.

The anomaly detection module 125 may also be responsible for periodically requesting an appropriate ML model of the ML model(s) 126 trained for the type of workload at issue to perform inference processing to classify a storage protocol connection count for a given temporal window as anomalous or not and provide a corresponding alert threshold (e.g., low, medium, or high importance). To the extent multiple types of workloads may be utilizing the storage system 120 concurrently, the anomaly detection module 125 may further be responsible for determining the type of workload at issue on the fly to facilitate making its inference requests to the appropriate ML model. Alternatively, the type of workload may be known in advance. For example, a payroll processing workload may be performed in accordance with a schedule during a particular timeframe on a weekly, bi-weekly, or monthly basis. Further details regarding an example of anomaly detection processing involving one or more of the monitoring module 124, the anomaly detection module 125 and the ML models 126 are described below with reference to FIG. 6.

The alerting module 122 may be responsible for providing appropriate warnings and/or alerts as needed or configured to customer support personnel, a reporting dashboard, and/or an administrative user of the storage system 120 based on the identification of anomalous activity by the ML model(s) 126 and the corresponding alert threshold.

The remediation module 123 may be responsible for carrying out various actions to address or mitigate the anomalous number of storage protocol connections. In one embodiment, an alert threshold of high-importance may cause the remediation module 123 to perform load balancing by moving a given workload from a first node of the storage system 120 to another node of the storage system 120, for example, by moving or reassigning responsibility for one or more volumes used by the given workload to the other node. Such remedial action may enhance the performance of the storage system 120 and/or make it more resilient to temporary or sustained spikes in storage protocol connections.

The ML model(s) 126 may include one or more ML models (e.g., Isolation Forest or Random Cut Forest ML algorithms) trained, for example, by external process(es) 140 (e.g., in the cloud) for a particular type of workload based on the customer's telemetry data 141. Advantageously, such training makes alerting provided by the ML model(s) 126 more relevant, reliable, and actionable on the part of customer support personnel, an administrative user of the storage system, and/or the storage system, for example, as a result of the filtering out of expected seasonal spikes in storage protocol connections and the correlation of the performance of the storage system 120 with the number of storage protocol connections. A non-limiting example of how an ML model of the ML model(s) 126 may be trained (either on-box or in the cloud) is described further below with reference to FIG. 5A. The ML model(s) 126 may be responsible for classifying a specified storage protocol connection count for a specified temporal window as anomalous or not (for a given type of workload for which the ML model at issue was trained) and providing a corresponding alert threshold based on their respective training.

While in the context of the present example, ML model training may be performed external to the storage system 120, for example, in the cloud based on customer telemetry data collected over a period of time, to the extent such telemetry collection functionality is not available or based on the usage of a sufficiently lightweight ML algorithm, such training may alternatively be performed on-box based on real-time monitoring of system metrics via API 121. Similarly, while anomaly detection is shown as being performed on-box, such functionality could just as easily be performed external to the storage system 120, albeit with some additional latency. As such, the location of the performance of various functions such as training, monitoring, and anomaly detection are a matter of design choice based on the needs of the particular alerting system deployment.

The various functional units and modules described herein, and the processing described below, for example, with reference to the flow diagrams of FIGS. 5A and 6 may be implemented in the form of executable instructions stored on a machine readable medium and executed, for example, in the form of one or more services, microservices, or processes, by one or more processing resources (e.g., one or more of a microcontroller, a microprocessor, central processing unit core(s), an application-specific integrated circuit (ASIC), a field programmable gate array (FPGA), and the like) and/or in the form of other types of electronic circuitry. For example, the processing may be performed by one or more virtual or physical computer systems of various forms (e.g., servers, blades, network storage systems or appliances, and storage arrays, such as the node described with reference to FIG. 3 below.

Example Distributed Storage System Cluster

Figure 2:
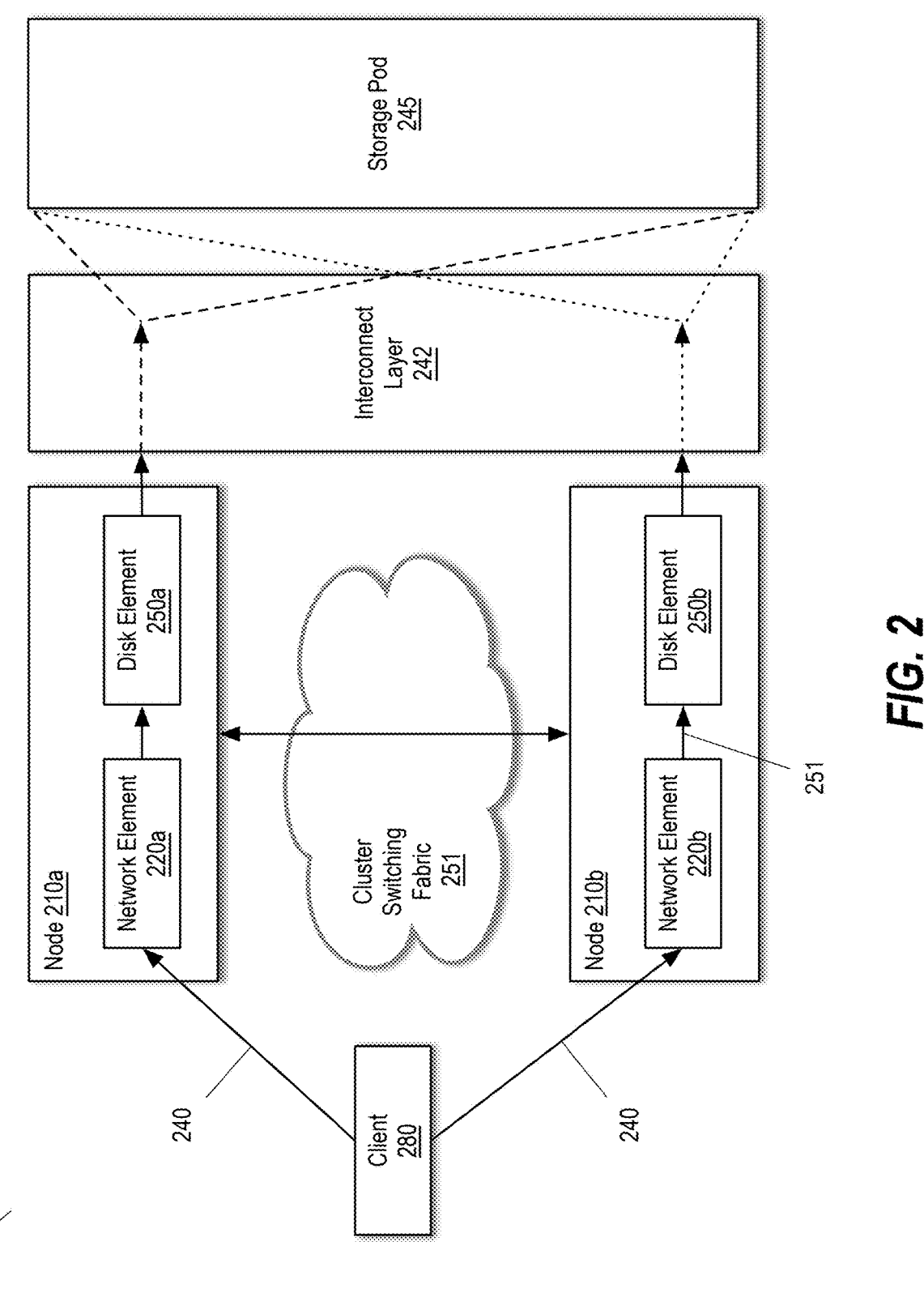
FIG. 2 is a block diagram illustrating a plurality of nodes interconnected as a cluster in accordance with an embodiment of the present disclosure.

FIG. 2 is a block diagram illustrating a plurality of nodes 210*a-b* interconnected as a cluster 200 in accordance with an embodiment of the present disclosure. In the context of the present example, the nodes 210*a-b* comprise various functional components that cooperate to provide a distributed storage system architecture of the cluster 200 (which may be analogous to storage system 120 of FIG. 1). To that end, in the context of the present example, each node is generally organized as a network element (e.g., network element 220*a* or 220*b*) and a disk element (e.g., disk element 250*a* or 250*b*). The network element includes functionality that enables the node to connect to clients (e.g., client 280) over a computer network 240, while each disk element 350 connects to one or more storage devices, such as disks, of one or more disk arrays (not shown) or of one or more storage shelves (not shown), or cloud volumes collectively representing a single shared storage pod 245.

In the context of the present example, the nodes 210*a-b* are interconnected by a cluster switching fabric 251 which, in an example, may be embodied as a Gigabit Ethernet switch. It should be noted that while there is shown an equal number of network and disk elements in the illustrative cluster 200, there may be differing numbers of network and/or disk elements. For example, there may be a plurality of network elements and/or disk elements interconnected in a cluster configuration 200 that does not reflect a one-to-one correspondence between the network and disk elements. As such, the description of a node comprising one network element and one disk element should be taken as illustrative only.

Clients may be general-purpose computers configured to interact with a node in accordance with a client/server model of information delivery. That is, each client (e.g., client 280) may request the services of the node, and the node may return the results of the services requested by the client, by exchanging packets over the network 240. The client may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks. An administrative user (not shown) of the storage system may make use of a user interface (UI) presented by the cluster or a command line interface (CLI) of the cluster to, among other things, establish a data protection relationship between a source volume and a destination volume (e.g., a mirroring relationship specifying one or more policies associated with creation, retention, and transfer of snapshots), defining snapshot and/or backup policies, and association of snapshot policies with snapshots.

Disk elements 250a and 250b may illustratively be connected to disks (not shown) that may be organized into disk arrays within the storage pod 245. Alternatively, storage devices other than disks may be utilized, e.g., flash memory, optical storage, solid state devices, etc. As such, the description of disks should be taken as exemplary only.

In some embodiments, every node (e.g., nodes 210a-b) can essentially talk to every storage device (e.g., disk or cloud volume) of the storage pod 245. In this manner, all nodes (e.g., nodes 210a-b) of the cluster may be provided with visibility and read access to an entirety of a global PVBN space of the storage pod 245, for example, via an interconnect layer 242. For example, the storage within the storage pod 245 may be grouped into distinct allocation areas (AAs) (e.g., multiple RAID stripes) that can be assigned to a given dynamically extensible file system (DEFS) (not shown) of a node to facilitate implementation disaggregated storage. The AAs assigned to a given DEFS may be said to "own" the assigned AAs and the node owning the given DEFS has the exclusive write access to the associated PVBNs and the exclusive ability to perform write allocation from such blocks. In one embodiment, each node has its own view of a portion of the disaggregated storage represented by the assignment of, for example, via respective allocation area (AA) maps and active maps.

In alternative embodiments, the storage devices (e.g., disks or cloud volumes) of the storage pod 245 may be organized into RAID groups, for example, with a first set of one or more RAID groups being associated with an aggregate (e.g., a collection of storage devices) and having a first PVBN space visible to one node and another set of one or more RAID groups being associated with an aggregate having a second PVBN space visible to another node. In such an embodiment, the entirety of a given storage device (e.g., a disk or cloud volume) is owned by a given node-level aggregate and the aggregate file system is visible from only one node of the cluster.

Depending on the particular implementation, the interconnect layer 242 may be excluded, for example, when node-level aggregates are used. When utilized, the interconnect layer 242 may be represented by an intermediate switching topology or some other interconnectivity layer or disk switching layer between the disks in the storage pod 245 and the nodes. Non-limiting examples of the interconnect layer 242 include one or more fiber channel switches or one or more non-volatile memory express (NVMe) fabric switches.

Example Storage System Node

Figure 3:
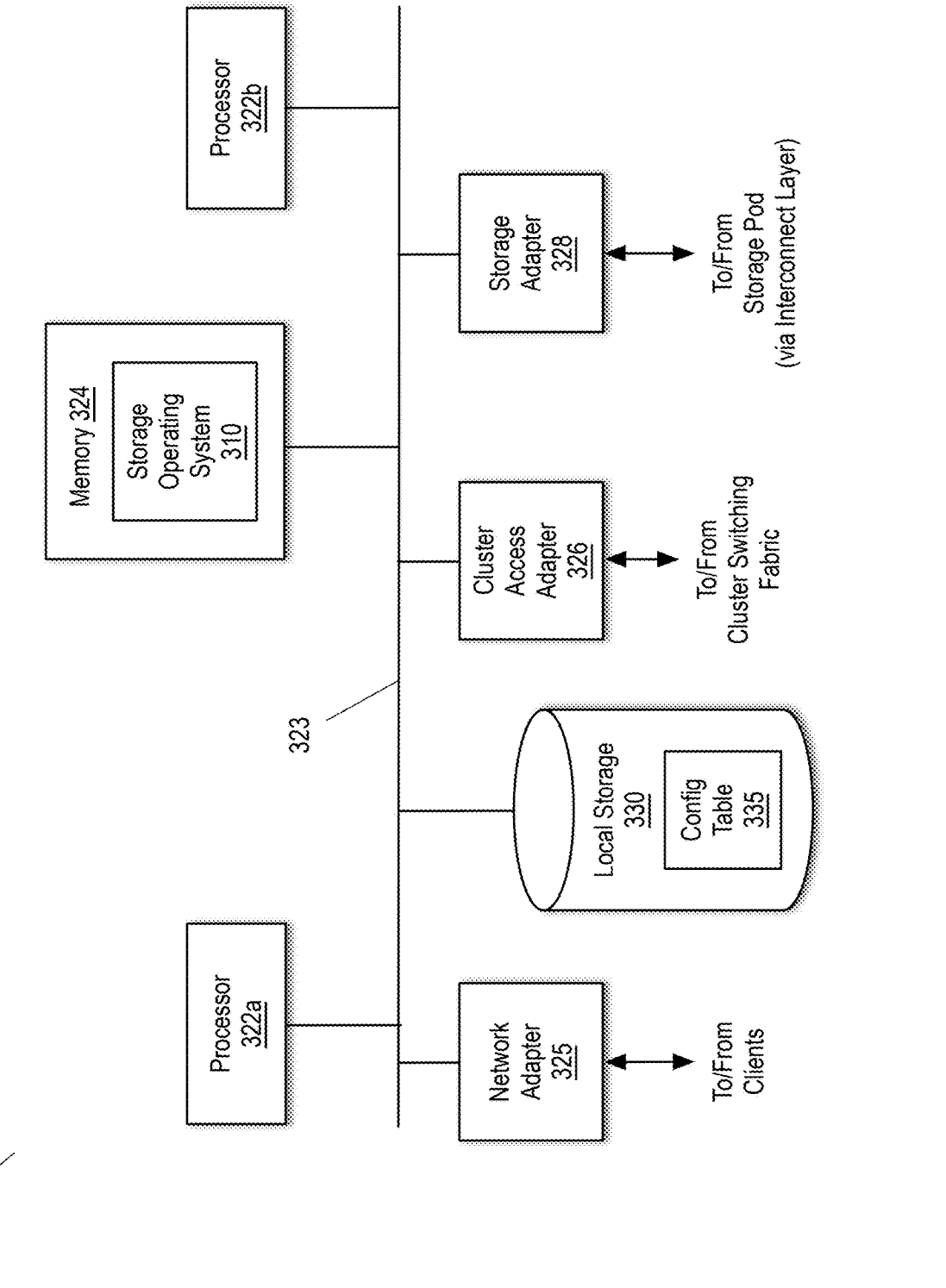
FIG. 3 is a block diagram illustrating a node in accordance with an embodiment of the present disclosure.

FIG. 3 is a block diagram of a node 300 that is illustratively embodied as a storage system comprising a plurality of processors (e.g., processors 322a-b), a memory 324, a network adapter 325, a cluster access adapter 326, a storage adapter 328 and local storage 330 interconnected by a system bus 323. Node 300 may be analogous to nodes 210a and 210b of FIG. 2. The local storage 330 comprises one or more storage devices, such as disks, utilized by the node to locally store configuration information (e.g., in configuration table 335). The cluster access adapter 326 comprises a plurality of ports adapted to couple the node 300 to other nodes of the cluster (e.g., cluster 300). Illustratively, Ethernet is used as the clustering protocol and interconnect media, although it will be apparent to those skilled in the art that other types of protocols and interconnects may be utilized within the cluster architecture described herein. Alternatively, where the network elements and disk elements are implemented on separate storage systems or computers, the cluster access adapter 326 is utilized by the network and disk element for communicating with other network and disk elements in the cluster.

In the context of the present example, each node 300 is illustratively embodied as a dual processor storage system executing a storage operating system 310 that implements a high-level module, such as a file system, to logically organize the information as a hierarchical structure of named directories, files and special types of files called virtual disks (hereinafter generally "blocks") on the disks. However, it will be apparent to those of ordinary skill in the art that the node 300 may alternatively comprise a single or more than two processor system. Illustratively, one processor (e.g., processor 322a) may execute the functions of the network element (e.g., network element 220a or 220b) on the node, while the other processor (e.g., processor 322b) may execute the functions of the disk element (e.g., disk element 250a or 250b).

The memory 324 illustratively comprises storage locations that are addressable by the processors and adapters for storing software program code and data structures associated with the subject matter of the disclosure. The processor and adapters may, in turn, comprise processing elements and/or logic circuitry configured to execute the software code and manipulate the data structures. The storage operating system 310, portions of which is typically resident in memory and executed by the processing elements, functionally organizes the node 300 by, inter alia, invoking storage operations in support of the storage service implemented by the node. It will be apparent to those skilled in the art that other processing and memory means, including various computer readable media, may be used for storing and executing program instructions pertaining to the disclosure described herein.

The network adapter 325 comprises a plurality of ports adapted to couple the node 300 to one or more clients (e.g., client 280) over point-to-point links, wide area networks, virtual private networks implemented over a public network (Internet) or a shared local area network. The network adapter 325 thus may comprise the mechanical, electrical and signaling circuitry needed to connect the node to a network (e.g., computer network 240). Illustratively, the network may be embodied as an Ethernet network or a Fibre Channel (FC) network. Each client (e.g., client 280) may communicate with the node over network by exchanging discrete frames or packets of data according to pre-defined protocols, such as TCP/IP.

The storage adapter 328 cooperates with the storage operating system 310 executing on the node 300 to access information requested by the clients. The information may be stored on any type of attached array of writable storage device media such as video tape, optical, DVD, magnetic tape, bubble memory, electronic random access memory, micro-electromechanical and any other similar media adapted to store information, including data and parity information. However, as illustratively described in various examples herein, the information may be stored on disks (e.g., associated with storage pod 245). The storage adapter comprises a plurality of ports having input/output (I/O) interface circuitry that couples to the disks over an I/O interconnect arrangement, such as a conventional high-performance, FC link topology.

Storage of information on each disk array may be implemented as one or more storage "volumes" that comprise a collection of physical storage disks or cloud volumes cooperating to define an overall logical arrangement of volume block number (VBN) space on the volume(s). Each logical volume is generally, although not necessarily, associated with its own file system. The disks within a logical volume/file system are typically organized as one or more groups, wherein each group may be operated as a RAID group. Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used.

While in the context of the present example, the node may be a physical host, it is to be appreciated the node may be implemented in virtual form. For example, a storage system or node of a storage system may be run (e.g., on a VM or as a containerized instance, as the case may be) within a public cloud provider. As such, a cluster representing a distributed storage system may be comprised of multiple physical nodes (e.g., node 300) or multiple virtual nodes (virtual storage systems).

Example Storage Operating System

To facilitate access to the disks (e.g., disks within one or more disk arrays of a storage pod, such as storage pod 245 of FIG. 2), a storage operating system (e.g., storage operating system 400, which may be analogous to storage operating system 310) may implement a write-anywhere file system that cooperates with one or more virtualization modules to "virtualize" the storage space provided by disks. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of blocks on the disks that are exported as named logical unit numbers (LUNs).

Illustratively, the storage operating system may be the Data ONTAP operating system available from NetApp, Inc., San Jose, Calif. that implements the Write Anywhere File Layout (WAFL) file system. However, it is expressly contemplated that any appropriate storage operating system may be enhanced for use in accordance with the inventive principles described herein. As such, where the term "WAFL" is employed, it should be taken broadly to refer to any file system (e.g., a copy-on-write file system, a write-anywhere file system, a write in place file system, or the like) that is otherwise adaptable to the teachings of this disclosure.

Figure 4:
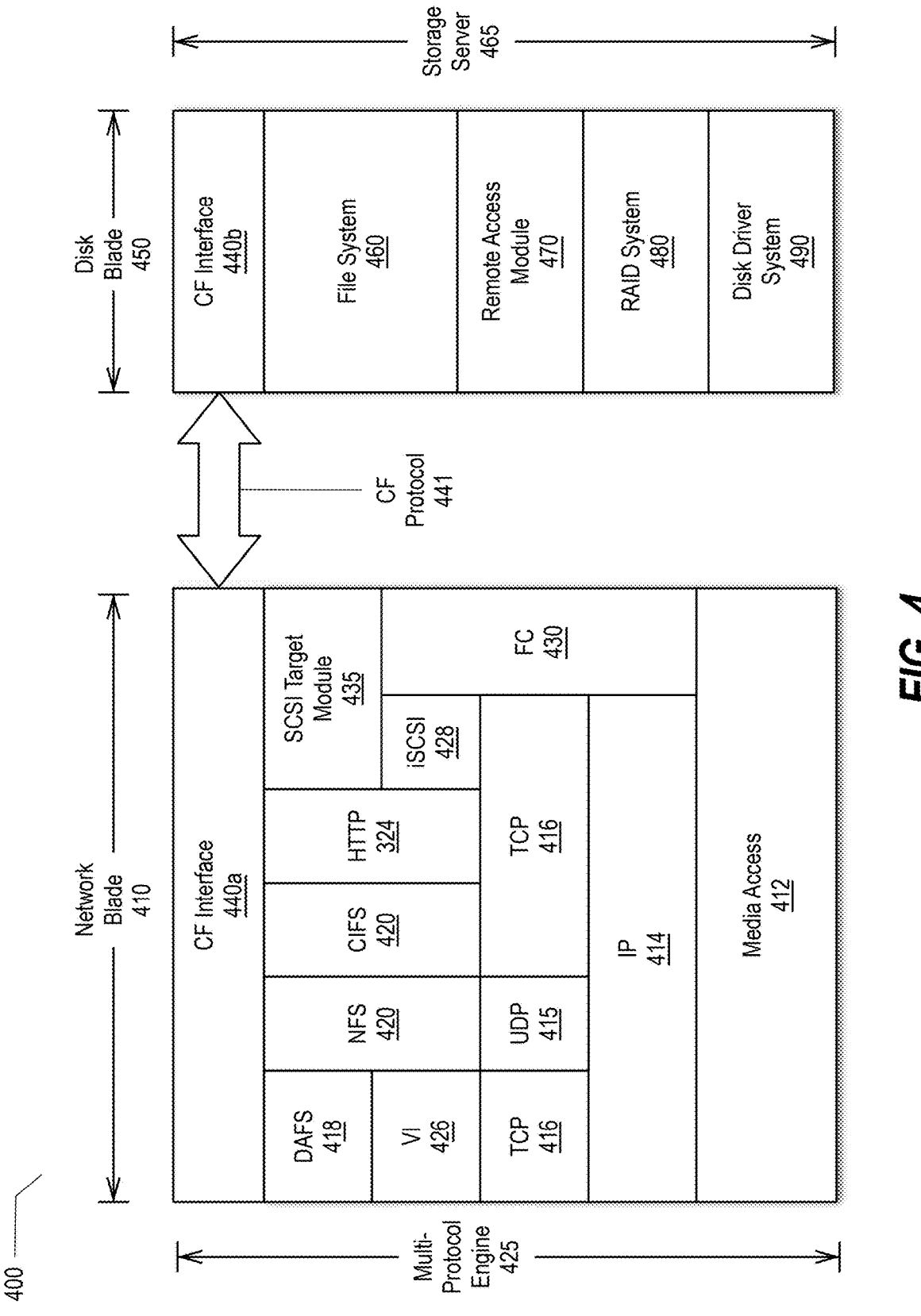
FIG. 4 is a block diagram illustrating a storage operating system in accordance with an embodiment of the present disclosure.

FIG. 4 is a block diagram illustrating a storage operating system 400 in accordance with an embodiment of the present disclosure. In the context of the present example, the storage operating system 400 is shown including a series of software layers organized to form an integrated network protocol stack or, more generally, a multi-protocol engine 425 that provides data paths for clients to access information stored on the node using block and file access protocols. The multi-protocol engine includes a media access layer 412 of network drivers (e.g., gigabit Ethernet drivers) that interfaces to network protocol layers, such as the IP layer 414 and its supporting transport mechanisms, the TCP layer 416 and the User Datagram Protocol (UDP) layer 415. A file system protocol layer provides multi-protocol file access and, to that end, includes support for the Direct Access File System (DAFS) protocol 418, the NFS protocol 420, the CIFS protocol 422 and the Hypertext Transfer Protocol (HTTP) protocol 424. A VI layer 426 implements the VI architecture to provide direct access transport (DAT) capabilities, such as RDMA, as required by the DAFS protocol 418. An iSCSI driver layer 428 provides block protocol access over the TCP/IP network protocol layers, while a FC driver layer 430 receives and transmits block access requests and responses to and from the node. The FC and iSCSI drivers provide FC-specific and iSCSI-specific access control to the blocks and, thus, manage exports of LUNs to either iSCSI or FCP or, alternatively, to both iSCSI and FCP when accessing the blocks on the node (e.g., node 200).

In addition, the storage operating system may include a series of software layers organized to form a storage server 465 that provides data paths for accessing information stored on the storage devices (e.g., storage devices 130) of the node. To that end, the storage server 465 includes a file system module 460 in cooperating relation with a remote access module 470, a RAID system module 480 and a disk driver system module 490. The RAID system 480 manages the storage and retrieval of information to and from the volumes/disks in accordance with I/O operations, while the disk driver system 490 implements a disk access protocol such as, e.g., the SCSI protocol.

The file system 460 may implement a virtualization system of the storage operating system 400 through the interaction with one or more virtualization modules illustratively embodied as, for example, a virtual disk (vdisk) module (not shown) and a SCSI target module 435. The SCSI target module 435 is generally disposed between the FC and iSCSI drivers 428, 430 and the file system 460 to provide a translation layer of the virtualization system between the block (LUN) space and the file system space, where LUNs are represented as blocks.

The file system 460 is illustratively a message-based system that provides logical volume management capabilities for use in access to the information stored on the storage devices, such as disks. That is, in addition to providing file system semantics, the file system 460 provides functions normally associated with a volume manager. These functions include (i) aggregation of the disks, (ii) aggregation of storage bandwidth of the disks, and (iii) reliability guarantees, such as mirroring and/or parity (RAID). The file system 460 illustratively implements an exemplary a file system having an on-disk format representation that is block-based using, e.g., 4 kilobyte (KB) blocks and using index nodes ("inodes") to identify files and file attributes (such as creation time, access permissions, size and block location). The file system uses files to store meta-data describing the layout of its file system; these meta-data files include, among others, an inode file. A file handle, i.e., an identifier that includes an inode number, is used to retrieve an inode from disk.

Broadly stated, all inodes of the write-anywhere file system are organized into the inode file. A file system (fs) info block specifies the layout of information in the file system and includes an inode of a file that includes all other inodes of the file system. Each logical volume (file system) has an fsinfo block that is preferably stored at a fixed location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

Operationally, a request from a client (e.g., client 280) is forwarded as a packet over a computer network (e.g., computer network 240) and onto a node (e.g., node 200) where it is received at a network adapter (e.g., network adaptor 225). A network driver (of layer 412 or layer 430) processes the packet and, if appropriate, passes it on to a network protocol and file access layer for additional processing prior to forwarding to the file system 460. Here, the file system generates operations to load (retrieve) the requested data from storage (e.g., storage device(s) 130) if it is not resident "in core", i.e., in memory 224. If the information is not in memory, the file system 460 indexes into the inode file using the inode number to access an appropriate entry and retrieve a logical VBN. The file system then passes a message structure including the logical VBN to the RAID system 480; the logical VBN is mapped to a disk identifier and disk block number (disk,dbn) and sent to an appropriate driver (e.g., SCSI) of the disk driver system 490. The disk driver accesses the dbn from the specified storage device and loads the requested data block(s) in memory for processing by the node. Upon completion of the request, the node (and operating system) returns a reply to the client 280 over the network 240.

The remote access module 470 is operatively interfaced between the file system module 460 and the RAID system module 480. Remote access module 470 is illustratively configured as part of the file system to implement the functionality to determine whether a newly created data container, such as a subdirectory, should be stored locally or remotely. Alternatively, the remote access module 470 may be separate from the file system. As such, the description of the remote access module being part of the file system should be taken as exemplary only. Further, the remote access module 470 determines which remote flexible volume should store a new subdirectory if a determination is made that the subdirectory is to be stored remotely. More generally, the remote access module 470 implements the heuristics algorithms used for the adaptive data placement. However, it should be noted that the use of a remote access module should be taken as illustrative. In alternative aspects, the functionality may be integrated into the file system or other module of the storage operating system. As such, the description of the remote access module 470 performing certain functions should be taken as exemplary only.

It should be noted that the software "path" through the storage operating system layers described above needed to perform data storage access for the client request received at the node may alternatively be implemented in hardware. That is, a storage access request data path may be implemented as logic circuitry embodied within a field programmable gate array (FPGA) or an application specific integrated circuit (ASIC). This type of hardware implementation increases the performance of the storage service provided by node 200 in response to a request issued by client 280. Alternatively, the processing elements of adapters 225, 228 may be configured to offload some or all of the packet processing and storage access operations, respectively, from processor 222, to thereby increase the performance of the storage service provided by the node. It is expressly contemplated that the various processes, architectures and procedures described herein can be implemented in hardware, firmware or software.

As used herein, the term "storage operating system" generally refers to the computer-executable code operable on a computer to perform a storage function that manages data access and may, in the case of a node (e.g., node 200), implement data access semantics of a general purpose operating system. The storage operating system can also be implemented as a microkernel, an application program operating over a general-purpose operating system, such as UNIX or Windows NT, or as a general-purpose operating system with configurable functionality, which is configured for storage applications as described herein.

In addition, it will be understood to those skilled in the art that aspects of the disclosure described herein may apply to any type of special-purpose (e.g., file server, filer or storage serving appliance) or general-purpose computer, including a standalone computer or portion thereof, embodied as or including a storage system. Moreover, the teachings contained herein can be adapted to a variety of storage system architectures including, but not limited to, a network-attached storage environment, a storage area network and disk assembly directly attached to a client or host computer. The term "storage system" should therefore be taken broadly to include such arrangements in addition to any subsystems configured to perform a storage function and associated with other equipment or systems. It should be noted that while this description is written in terms of a write anywhere file system, the teachings of the subject matter may be utilized with any suitable file system, including a write in place file system.

Example Cluster Fabric (CF) Protocol

Illustratively, the storage server 465 is embodied as disk element (or disk blade 450, which may be analogous to disk element 250a or 250b) of the storage operating system 400 to service one or more volumes (e.g., volumes 128). In addition, the multi-protocol engine 425 is embodied as network element (or network blade 410, which may be analogous to network element 220*a* or 220*b*) to (*i*) perform protocol termination with respect to a client issuing incoming data access request packets over the network (e.g., network 240), as well as (ii) redirect those data access requests to any storage server 465 of the cluster (e.g., cluster 200). Moreover, the network element 410 and disk element 450 cooperate to provide a highly scalable, distributed storage system architecture of the cluster. To that end, each module may include a cluster fabric (CF) interface module (e.g., CF interface 440*a* and 440*b*) adapted to implement intra-cluster communication among the nodes (e.g., node 210*a* and 210*b*). In the context of a distributed storage architecture in which node-level aggregates are employed, the CF protocol may facilitate, among other things, inter-node communications relating to data access requests. It is to be appreciated such internode communications relating to data access requests are not needed in the context of a distributed storage architecture making use of a storage pod (e.g., storage pod 245) as described above with reference to FIG. 2 in which each node of a cluster has visibility and access to the entirety of a global PVBN space of a storage pod (via their respective DEFSs). However, in various embodiments, some limited amount of internode communications, may continue to be useful.

The protocol layers, e.g., the NFS/CIFS layers and the iSCSI/IFC layers, of the network element 410 may function as protocol servers that translate file-based and block based data access requests from clients into CF protocol messages used for communication with the disk element 450. That is, the network element servers may convert the incoming data access requests into file system primitive operations (commands) that are embedded within CF messages by the CF interface module 440 for transmission to the disk elements of the cluster.

Further, in an illustrative aspect of the disclosure, the network element and disk element are implemented as separately scheduled processes of storage operating system 400; however, in an alternate aspect, the modules may be implemented as pieces of code within a single operating system process. Communication between a network element and disk element may thus illustratively be effected through the use of message passing between the modules although, in the case of remote communication between a network element and disk element of different nodes, such message passing occurs over a cluster switching fabric (e.g., cluster switching fabric 251). A known message-passing mechanism provided by the storage operating system to transfer information between modules (processes) is the Inter Process Communication (IPC) mechanism. The protocol used with the IPC mechanism is illustratively a generic file and/or block-based "agnostic" CF protocol that comprises a collection of methods/functions constituting a CF application programming interface (API). Examples of such an agnostic protocol are the SpinFS and SpinNP protocols available from NetApp, Inc.

The CF interface module 440 implements the CF protocol for communicating file system commands among the nodes or modules of cluster. Communication may be illustratively effected by the disk element exposing the CF API to which a network element (or another disk element) issues calls. To that end, the CF interface module 440 may be organized as a CF encoder and CF decoder. The CF encoder of, e.g., CF interface 440*a* on network element 410 encapsulates a CF message as (i) a local procedure call (LPC) when communicating a file system command to a disk element 450 residing on the same node 200 or (ii) a remote procedure call (RPC) when communicating the command to a disk element residing on a remote node of the cluster 200. In either case, the CF decoder of CF interface 440*b* on disk element 450 de-encapsulates the CF message and processes the file system command.

Illustratively, the remote access module 470 may utilize CF messages to communicate with remote nodes to collect information relating to remote flexible volumes. A CF message is used for RPC communication over the switching fabric between remote modules of the cluster; however, it should be understood that the term "CF message" may be used generally to refer to LPC and RPC communication between modules of the cluster. The CF message includes a media access layer, an IP layer, a UDP layer, a reliable connection (RC) layer and a CF protocol layer. The CF protocol is a generic file system protocol that may convey file system commands related to operations contained within client requests to access data containers stored on the cluster; the CF protocol layer is that portion of a message that carries the file system commands. Illustratively, the CF protocol is datagram based and, as such, involves transmission of messages or "envelopes" in a reliable manner from a source (e.g., a network element 410) to a destination (e.g., a disk element 450). The RC layer implements a reliable transport protocol that is adapted to process such envelopes in accordance with a connectionless protocol, such as UDP.

Example High-Level Operation of an Alerting System

Figure 5A:
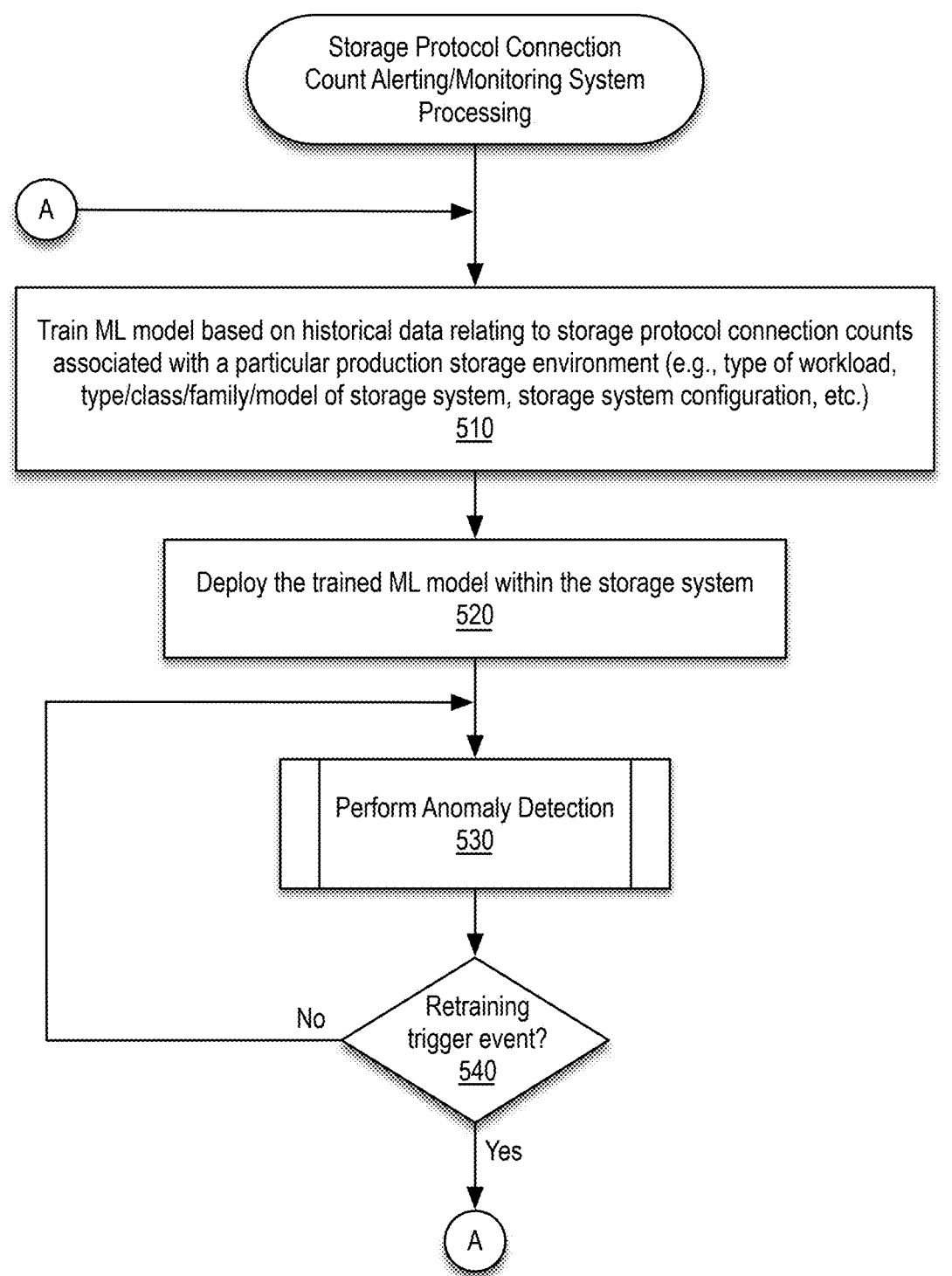
FIG. 5A is a high-level flow diagram illustrating operations for storage protocol connection count alerting/monitoring system processing in accordance with an embodiment of the present disclosure.

FIG. 5A is a high-level flow diagram illustrating operations for storage protocol connection count alerting/monitoring system processing in accordance with an embodiment of the present disclosure. The processing described with reference to FIG. 5A may be performed by an alerting system including one or more of the functional units (e.g., external process(es) 140, alerting module 122, monitoring module 124, anomaly detection 125, and ML model(s) 126 described above with reference to FIG. 1.

At block 510, an ML model (e.g., an anomaly detection algorithm, such as Isolation Forest, Random Cut Forest, or the like) may be trained based on a number of years (e.g., 2 years or more) of historical data (e.g., telemetry data 141) collected from a given customer's production storage environment. Generally, training of an ML model would be performed in a cloud environment; however, use of a lightweight anomaly detection algorithm may allow training to be performed in the production environment.

In one embodiment, a separate ML model is trained for each type of workload for which storage protocol connection count alerting is desired to be performed. By training an ML model based on an individual customer's telemetry data, the type/class/family/model of the storage system (e.g., storage system 120) and its configuration are taken into consideration. Similarly, by training the ML model based on the individual customer's telemetry data associated with a specific workload or type of workload, the pattern of operation of the workload, including seasonal changes (e.g., end-of-month, end-of-quarter, end-of-year, and similar events) peak and off-peak usage patterns are factored in, thereby reducing alerts that might otherwise be generated by training based on telemetry data including numerous workload types.

In one embodiment, a correlation between (i) storage protocol connections made on behalf of known, common, or generalizable workload (e.g., a particular workload type) and (ii) performance and/or health of the storage system, for example, as represented by contemporaneous system and/or client metrics persisted to the telemetry data may be calculated.

At this point, the anomaly detection algorithm may be trained and tested on rolling temporal windows of historical data to establish respective thresholds of detected anomalies that should be categorized as anomalous per window and per workload. As noted above, the lengths and number of the temporal windows may be determined with input from domain experts. In one example, the anomaly detection algorithms may be trained on univariate time series data for the number of storage protocols connections for a given system (e.g., node, volume, etc.). Based on input from domain experts, a determination may be made regarding what was anomalous across the various horizons and the number of anomalous events may be bucketed with respect to the temporal window based on anomaly scores. For example, these scores could range from 0-100 with 100 being the most anomalous event. The anomaly scores may then be assessed by predetermined thresholds (e.g., 60 for low, 70 for medium, and 80 for high, for example, to allow alerts to be directed to relevant stakeholders based on these severity scores. Additionally, edge case rule sets may be applied to better inform blind spots in the anomaly detection algorithm. The edge cases are generally workload dependent and could vary. A classic example of an edge case is a seasonally (e.g., daily, weekly, monthly, quarterly, etc.) connection-heavy event like a large database Create, Read, Update, and Delete (CRUD) operation or periods of time during which many employees/users are connected to their respective Virtual Desktop Infrastructures (VDIs).

In one embodiment, storage protocol connection count alerting thresholds (e.g., iSCSI connection count alerting thresholds) can be established on a per workload or workload type basis informed by analysis and domain knowledge with support and engineering teams. In the context of a payroll processing workload, for example, the threshold bands might be >40 to >=65 for low importance, >65 to <=85 for medium importance and >85 for high importance. When Isolation Forest is used as the anomaly detection algorithm, every data point is categorized as either an anomaly or not an anomaly (i.e., Binary classification); however, in the case of Random Cut Forest, custom detection thresholds may be established based on learned weights and user input.

At block 520, to the extent the ML model was trained remotely (off-box), the trained ML model may now be deployed within the storage system. Depending on the particular implementation, deployment of the trained ML model may be performed as part of installation of a new release of the storage operating system or an update to the storage operating system on the storage system.

At block 530, anomaly detection is performed. For example, on a periodic basis, responsive to a set of one or more predetermined or configurable events, and/or on an on-demand basis, an anomaly detection module (e.g., anomaly detection module 125) may request inferencing to be performed by the trained ML model for one or more storage protocol connection counts associated with respective temporal windows. A non-limiting example of anomaly detection processing is described further below with reference to FIG. 6.

At decision block 540, it is determined whether a retraining trigger event has occurred. If so, processing loops back to block 510 to retrain the ML model; otherwise, processing continues with block 530. In one embodiment, examples of retraining trigger events include observed model drift, a new workload, a change in the type of workload, changes to the storage system, and/or passing of a predetermined or configurable amount of time (e.g., X months) since the last retraining.

While in the context of the present example, it is assumed anomaly detection is performed on-box (by functionality residing within the storage system), it is to be appreciated in other examples, anomaly detection may be performed remotely (off-box) by one or more external processes (e.g., external process(es) 140), for example, running in a cloud-based environment.

While not depicted in the flow diagram of FIG. 5A, in some examples, remediation may be performed after detection of an anomalous number of storage protocol connections. For example, if the detected anomaly has an alert threshold of high-importance or is otherwise indicative of severe performance degradation of the storage system, a remediation module (e.g., remediation module 123) may initiate a load balancing process to move the workload at issue to another node of the storage system.

Example Isolation Forest Model

Figure 5B:
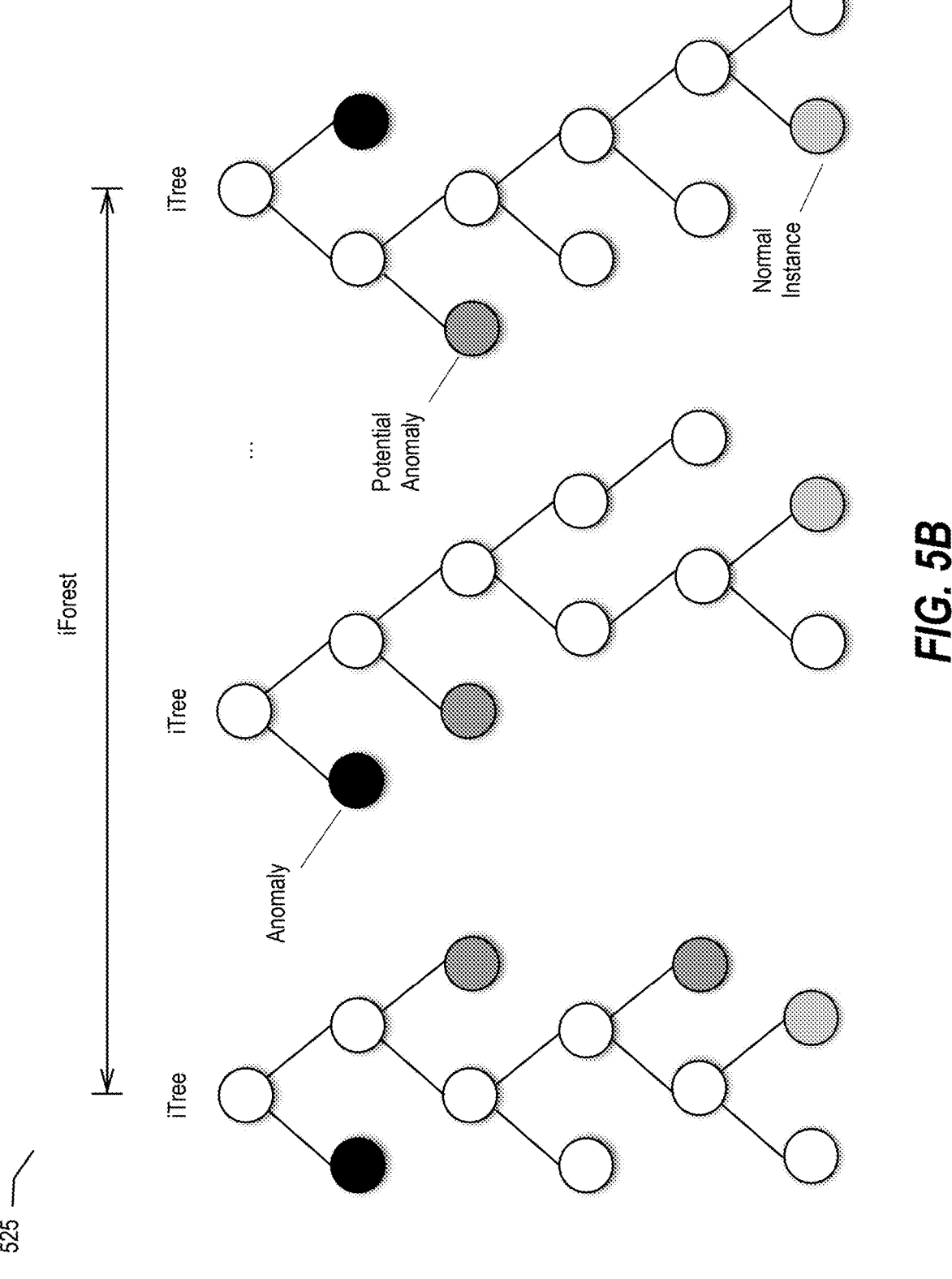
FIG. 5B is a block diagram illustrating an example of an Isolation Forest model in accordance with one or more embodiments.

FIG. 5B is a block diagram illustrating an example of an Isolation Forest model (e.g., iForest) 525 in accordance with one or more embodiments. Isolation Forest is an unsupervised ML algorithm for anomaly detection. Isolation Forest is an ensemble method (similar to random forest). For example, Isolation Forest uses the average of the predictions by several decision trees (e.g., binary trees) when assigning the final anomaly score to a given data point. Unlike other anomaly detection algorithms that may first define what is considered to be "normal" and then report anything else as anomalous, Isolation Forest attempts to isolate anomalous data points from the start. The algorithm has a linear time complexity and a low memory requirement, which works well with high-volume data. In essence the algorithm relies upon the characteristics of anomalies (i.e., being few and different) in order to detect anomalies. The premise of the Isolation Forest algorithm is that anomalous data points are easier to separate from the rest of the sample.

In an Isolation Forest, randomly sub-sampled data is typically processed in a tree structure (e.g., one or more iTrees) based on randomly selected features. The algorithm works by randomly selecting a feature, then randomly selecting a split value between the maximum and minimum values of the selected feature. The samples that travel deeper into a given tree are less likely to be anomalies as they required more cuts to isolate them.

When a forest of random trees collectively produce short path lengths for isolating some particular samples, they are highly likely to be anomalies and the measure of normality is close to 0. Similarly, large paths correspond to values close to 1 and are more likely to be inliers. In the context of the present example, the black-shaded tree nodes represent anomalous samples (e.g., samples representing outliers), the dark, gray-shaded tree nodes are potential anomalies, and the light, gray-shaded tree nodes are representative of normal instances of data samples.

Example ML Classification Model

Figure 5C:
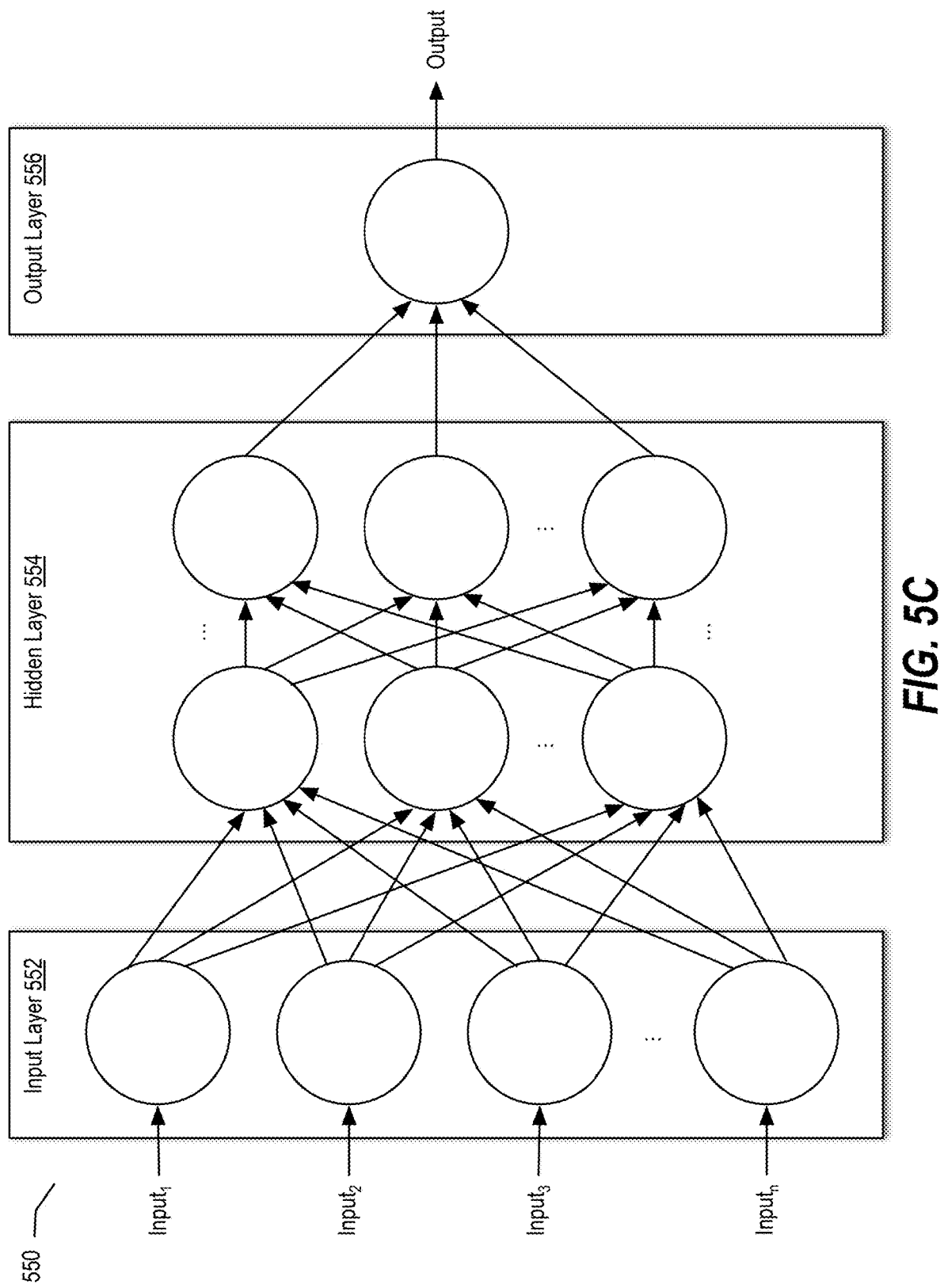
FIG. 5C is a block diagram illustrating an example of an ML classification model in accordance with one or more embodiments.

FIG. 5C is a block diagram illustrating an example of an ML classification model 550 in accordance with one or more embodiments. ML models are algorithms that can identify patterns or make predictions based on datasets. Unlike rule-based programs, ML models do not have to be explicitly coded and can evolve over time as new data enters the system. In one or more embodiments, the ML classification model 550 may be trained based on telemetry data (e.g., telemetry data 141) collected from a storage system (e.g., storage system 120).

In the context of the present example, the ML classification model is shown as a network of nodes (or "neurons") which are organized in layers (e.g., an input layer 552, one or more hidden layers 554, and an output layer 556). Based on the predictors (or inputs) provided to the input layer 552, forecasts (or outputs) are emitted by the output layer 556. Coefficients (not shown) associated with each of the predictors are generally referred to as weights. The forecasts are obtained by a combination (in this case, a non-linear combination) of the inputs. The weights may be selected using a learning algorithm that minimizes a cost function (e.g., mean absolute error, mean squared error, root mean squared error, etc.). The example ML classification model 550 depicted in FIG. 5C is representative of a multilayer feed-forward network, where each layer of nodes receives inputs from the previous layers. The outputs of the nodes in one layer are inputs to the next layer. The inputs to each node are combined using a weighted linear combination. The result is then modified by a nonlinear function before being output.

In general, ML classification algorithms may be used to predict a discrete outcome (y) using independent variables (x). ML has a variety of use-cases in different domains. Subscription-based media streaming platforms like Netflix and Spotify, for instance, use ML to recommend content to users based on their respective activity on the platform. In the context of various embodiments described herein, an ML classification model (e.g., ML classification model 550) may be trained remotely by one or more external processes (e.g., external process(es) 140), for example, to predict whether based on the telemetry data a number of storage protocol connections active with the storage system, representing an input (e.g., one of input$_1$ to input$_n$) to the input layer 152, is anomalous based on a state of the storage system (e.g., one or more metrics indicative of performance and/or health of the storage system), representing one or more other inputs (e.g., one of input$_1$ to input$_n$) to the input layer 152.

While in the context of the present example, only one ML classification model is shown, it is to be appreciated multiple different ML classification models may be employed. According to one embodiment, a different ML classification model may be trained on telemetry data on a per-workload basis (e.g., for each different workload or different type of workload) running on a specific storage system, for example, to achieve desired customer-specific alerting.

Example Anomaly Detection

Figure 6:
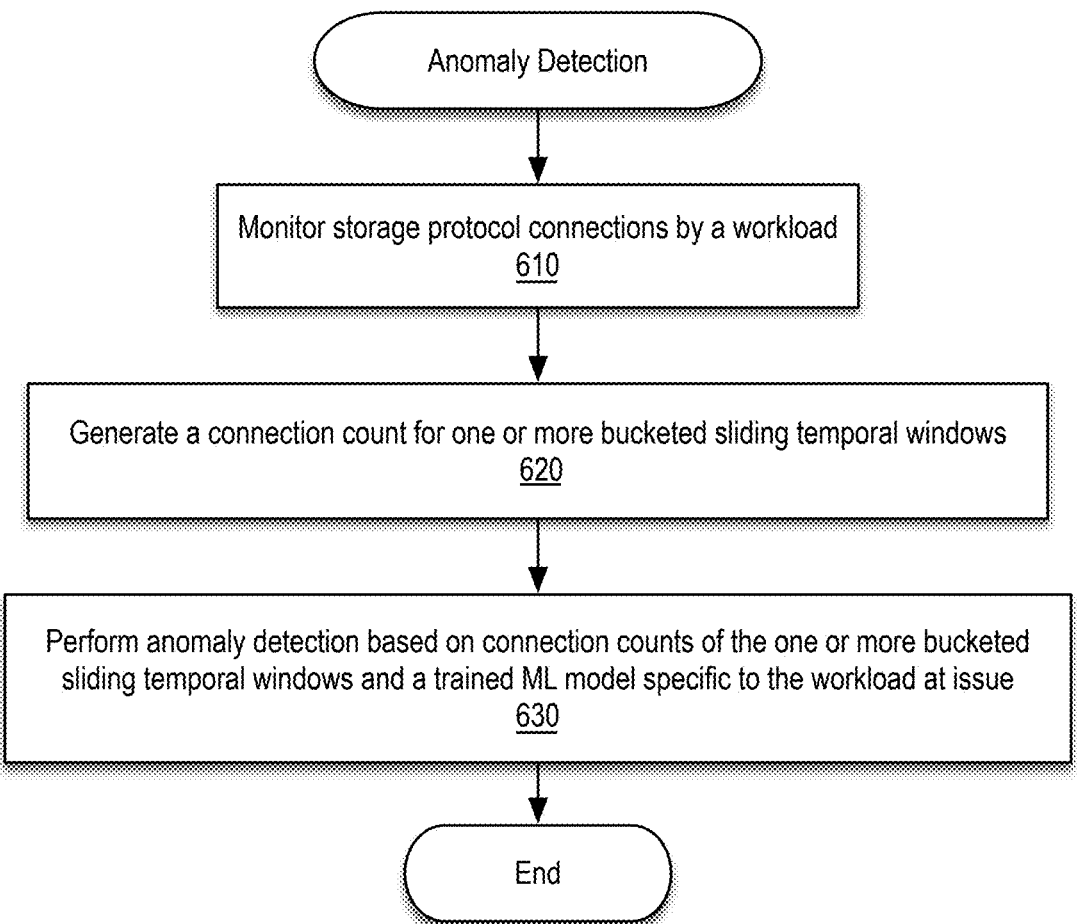
FIG. 6 is a flow diagram illustrating operations for performing anomaly detection in accordance with an embodiment of the present disclosure.

FIG. 6 is a flow diagram illustrating operations for performing anomaly detection in accordance with an embodiment of the present disclosure. The processing described with reference to FIG. 6 may be performed by anomaly detection functionality (e.g., anomaly detection module 125) local (on-box) to a storage system (e.g., storage system 120) or external (off-box) to the storage system.

At block 610, storage protocol connections associated with a workload (e.g., one of workload(s) 110) are monitored. For example, a method of an API (e.g., API 121) exposed by the storage system may be polled to retrieve the number of storage protocol connections. The number of storage protocol connections may represent the number of current active/open storage protocol connections at the time of the API call. In one embodiment, the data retrieved via the API is placed onto a message queue (e.g., Kafka, RabbitMQ, AWS Firehose, etc.).

At block 620, a storage protocol connection count is generated for one or more bucketed sliding temporal windows. For example, the message format (e.g., JavaScript Object Notation (JSON) or other lightweight data-interchange format) retrieved from the message queue may be parsed into a particular format of storage protocol connection count data (e.g., an n×1 dimensional vector) and the data may then be collected into a sliding temporal window (e.g., 30 seconds, 1 minute, 5 minutes, 15 minutes, 30 minutes, 1 hour, etc.). After the window expires, the data may be summed into rolling windows of various time horizons.

At block 630, anomaly detection is performed based on storage protocol connection counts of the one or more bucketed sliding temporal windows and a trained ML model (e.g., one of ML model(s) 126) specific to the workload at issue. For example, each aggregate window value may be passed through to the appropriate anomaly detection algorithm trained for the workload or type of workload at issue. In one embodiment, the output of the ML model identifies the input data point as an anomaly or not an anomaly and in the case of an anomaly the output also includes an alert threshold (e.g., low, medium, or high-importance). Based on the alert threshold, an appropriate alert may be sent to customer support personnel, a reporting dashboard of the storage system, and/or an administrative user of the customer (as needed).

While in the context of the flow diagrams of FIGS. 5A and 6 a number of enumerated blocks are included, it is to be understood that examples may include additional blocks before, after, and/or in between the enumerated blocks. Similarly, in some examples, one or more of the enumerated blocks may be omitted and/or performed in a different order.

Embodiments of the present disclosure include various steps, which have been described above. The steps may be performed by hardware components or may be embodied in machine-executable instructions, which may be used to cause one or more processing resources (e.g., one or more general-purpose or special-purpose processors) programmed with the instructions to perform the steps. Alternatively, depending upon the particular implementation, various steps may be performed by a combination of hardware, software, firmware and/or by human operators.

Embodiments of the present disclosure may be provided as a computer program product, which may include a non-transitory machine-readable storage medium embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to embodiments of the present disclosure with appropriate special purpose or standard computer hardware to execute the code contained therein. An apparatus for practicing various embodiments of the present disclosure may involve one or more computers (e.g., physical and/or virtual servers) (or one or more processors (e.g., processors 222*a-b*) within a single computer) and storage systems containing or having network access to computer program(s) coded in accordance with various methods described herein, and the method steps associated with embodiments of the present disclosure may be accomplished by modules, routines, subroutines, or sub-parts of a computer program product.

The term "storage media" as used herein refers to any non-transitory media that store data or instructions that cause a machine to operation in a specific fashion. Such storage media may comprise non-volatile media or volatile media. Non-volatile media includes, for example, optical, magnetic or flash disks, such as storage device (e.g., local storage 230). Volatile media includes dynamic memory, such as main memory (e.g., memory 224). Common forms of storage media include, for example, a flexible disk, a hard disk, a solid state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus (e.g., system bus 223). Transmission media can also take the form of acoustic or light waves, such as those generated during radio-wave and infra-red data communications.

Various forms of media may be involved in carrying one or more sequences of one or more instructions to the one or more processors for execution. For example, the instructions may initially be carried on a magnetic disk or solid state drive of a remote computer. The remote computer can load the instructions into its dynamic memory and send the instructions over a telephone line using a modem. A modem local to the computer system can receive the data on the telephone line and use an infra-red transmitter to convert the data to an infra-red signal. An infra-red detector can receive the data carried in the infra-red signal and appropriate circuitry can place the data on bus. Bus carries the data to main memory (e.g., memory 224), from which the one or more processors retrieve and execute the instructions. The instructions received by main memory may optionally be stored on storage device either before or after execution by the one or more processors.

All examples and illustrative references are non-limiting and should not be used to limit the applicability of the proposed approach to specific implementations and examples described herein and their equivalents. For simplicity, reference numbers may be repeated between various examples. This repetition is for clarity only and does not dictate a relationship between the respective examples. Finally, in view of this disclosure, particular features described in relation to one aspect or example may be applied to other disclosed aspects or examples of the disclosure, even though not specifically shown in the drawings or described in the text.

The foregoing outlines features of several examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:

performing real-time monitoring of system metrics of a storage system to obtain information indicative of a number of storage protocol connections between a host system running a workload and a storage device of the storage system during a predetermined or configurable time period by polling an application programming interface (API) exposed by the storage system;

generating a connection count for each of one or more bucketed sliding temporal windows based on the number of storage protocol connections and prior observations;

for each of the one or more bucketed sliding temporal windows, categorizing the connection count as anomalous or not in real time by determining, by a machine-learning (ML) model, based on the connection count, the bucketed sliding temporal window, and prior training of the ML model on rolling temporal windows of historical data in relation to usage of the storage system by a particular organization for a particular type of workload; and based at least in part on the connection count categorization, performing an automated remediation on the storage system to adjust a load on one or more nodes of a plurality of nodes interconnected as a cluster and representing the storage system, wherein the automated remediation includes moving the workload from a first node of the plurality of nodes to a second node of the plurality of nodes by reassigning responsibility for a volume used by the workload from the first node to the second node.

2. The method of claim 1, further comprising for a given anomalous connection count, determining an alert threshold of a plurality of alert thresholds.

3. The method of claim 2, further comprising based on the alert threshold, providing an alert regarding the given anomalous connection count to one or more of a customer support team, a reporting dashboard, and an administrative user of the storage system.

4. The method of claim 2, wherein the automated remediation is further based on the alert threshold.

5. The method of claim 1, wherein the number of storage protocol connections comprises a number of Internet Small Computer System Interface (iSCSI) protocol connections.

6. The method of claim 1, wherein the number of storage protocol connections comprises a number of Non-Volatile Memory Express (NVMe) protocol connections, a number of Server Message Block (SMB) protocol connections, a number of Network File System (NFS) protocol connections, a number of Common Internet File System (CIFS) protocol connections, a number of Fiber Channel (FC) protocol connections, a number of Fibre Channel over Ethernet (FCOE) protocol connections, or a number of NVMe over Fibre Channel (NVMeoF) protocol connections.

7. The method of claim 1, wherein a categorization of the connection count as anomalous is indicative of one or more of a performance issue, a networking problem, and a misconfiguration of the storage system.

8. A non-transitory machine readable medium storing instructions, which when executed by one or more processing resources of a storage system, cause the storage system to:

perform real-time monitoring of system metrics of a storage system to obtain information indicative of a number of storage protocol connections between a host system running a workload and a storage device of the storage system during a predetermined or configurable time period by polling an application programming interface (API) exposed by the storage system;

generate a connection count for each of one or more bucketed sliding temporal windows based on the number of storage protocol connections and prior observations;

for each of the one or more bucketed sliding temporal windows, categorizing the connection count as anomalous or not in real time by determining, by a machine-learning (ML) model, based on the connection count, the bucketed sliding temporal window, and prior training of the ML model on rolling temporal windows of historical data in relation to usage of the storage system by a particular organization for a particular type of workload; and based at least in part on the connection count categorization, perform an automated remediation on the storage system to adjust a load on one or more nodes of a plurality of nodes interconnected as a cluster and representing the storage system, wherein the automated remediation includes moving the workload from a first node of the plurality of nodes to a second node of the plurality of nodes by reassigning responsibility for a volume used by the workload from the first node to the second node.

9. The non-transitory machine readable medium of claim 8, wherein the instructions further cause the storage system to, for a given anomalous connection count, determine an alert threshold of a plurality of alert thresholds.

10. The non-transitory machine readable medium of claim 9, wherein the instructions further cause the storage system to, based on the alert threshold, provide an alert regarding the given anomalous connection count to one or more of a customer support team, a reporting dashboard, and an administrative user of the storage system.

11. The non-transitory machine readable medium of claim 9, wherein the number of storage protocol connections comprises a number of Internet Small Computer System Interface (iSCSI) protocol connections.

12. The non-transitory machine readable medium of claim 9, wherein the number of storage protocol connections comprises a number of Non-Volatile Memory Express (NVMe) protocol connections, a number of Server Message Block (SMB) protocol connections, a number of Network File System (NFS) protocol connections, a number of Common Internet File System (CIFS) protocol connections, a number of Fiber Channel (FC) protocol connections, a number of Fibre Channel over Ethernet (FCOE) protocol connections, or a number of NVMe over Fibre Channel (NVMeoF) protocol connections.

13. The non-transitory machine readable medium of claim 8, wherein a categorization of the connection count as anomalous is indicative of one or more of a performance issue, a networking problem, and a misconfiguration of the storage system.

14. A storage system comprising:

one or more processing resources; and instructions that when executed by the one or more processing resources cause the storage system to:

perform real-time monitoring of system metrics of a storage system to obtain information indicative of a number of storage protocol connections between a host system running a workload and a storage device of the storage system during a predetermined or configurable time period by polling an application programming interface (API) exposed by the storage system;

generate a connection count for each of one or more bucketed sliding temporal windows based on the number of storage protocol connections and prior observations;

for each of the one or more bucketed sliding temporal windows, categorizing the connection count as anomalous or not in real time by determining, by a machine-learning (ML) model, based on the connection count, the bucketed sliding temporal window, and prior training of the ML model on rolling temporal windows of historical data in relation to usage of the storage system by a particular organization for a particular type of workload; and based at least in part on the connection count categorization, perform an automated remediation on the storage system to adjust a load on one or more nodes of a plurality of nodes interconnected as a cluster and representing the storage system, wherein the automated remediation includes moving the workload from a first node of the plurality of nodes to a second node of the plurality of nodes by reassigning responsibility for a volume used by the workload from the first node to the second node.

15. The storage system of claim 14, wherein the instructions further cause the storage system to:

for a given anomalous connection count, determine an alert threshold of a plurality of alert thresholds; and provide an alert regarding the given anomalous connection count to one or more of a customer support team, a reporting dashboard, and an administrative user of the storage system.

16. The storage system of claim 14, wherein the number of storage protocol connections comprises a number of Internet Small Computer System Interface (iSCSI) protocol connections.

17. The storage system of claim 14, wherein the number of storage protocol connections comprises a number of Non-Volatile Memory Express (NVMe) protocol connections, a number of Server Message Block (SMB) protocol connections, a number of Network File System (NFS) protocol connections, a number of Common Internet File System (CIFS) protocol connections, a number of Fiber Channel (FC) protocol connections, a number of Fibre Channel over Ethernet (FCOE) protocol connections, or a number of NVMe over Fibre Channel (NVMeoF) protocol connections.

18. The storage system of claim 14, wherein a categorization of the connection count as anomalous is indicative of one or more of a performance issue, a networking problem, and a misconfiguration of the storage system.

\* \* \* \* \*